United States Patent [19]
Tsuzuki et al.

[11] Patent Number: 5,990,342
[45] Date of Patent: Nov. 23, 1999

[54] SURFACTANT, EMULSIFIER FOR EMULSION POLYMERIZATION, DISPERSANT FOR SUSPENSION POLYMERIZATION AND MODIFIER FOR RESIN MODIFICATION

[75] Inventors: Masahide Tsuzuki; Kaoru Komiya, both of Tokyo, Japan

[73] Assignee: Asahi Denka Kogyo K.K., Tokyo, Japan

[21] Appl. No.: 08/683,776

[22] Filed: Jul. 16, 1996

[30] Foreign Application Priority Data

Jul. 25, 1995 [JP] Japan .................................. 7-189472

[51] Int. Cl.[6] .......................... C07C 69/73; C07C 69/52
[52] U.S. Cl. ............................ 560/183; 560/55; 560/64; 560/74; 560/205; 562/465; 562/470; 562/471
[58] Field of Search ................................. 560/55, 64, 74, 560/183, 205; 562/465, 470, 471

[56] References Cited

U.S. PATENT DOCUMENTS 5,459,179  10/1995  Asanaka et al. ......................... 523/201

FOREIGN PATENT DOCUMENTS

| 62-22803 | 1/1987 | Japan . |
| 62-227434 | 10/1987 | Japan . |
| 62-227435 | 10/1987 | Japan . |
| 62-289229 | 12/1987 | Japan . |
| 63-151345 | 6/1988 | Japan . |

OTHER PUBLICATIONS

Chemical Astracts, vol. 108, No. 14, Apr. 4, 1988, Columbus, Ohio US; abstract No. 113502, Ichihara Akinobu: "Emulsifiers For Aqueous Resin Dispersions" p. 38; col. 2; XP002016498 & JP–A–62 240 304 (Daiichi Kogyo Seiyaku Co. Ltd.

CA abstract No. 108:187449, corresponding to JP 62289229 (Ichihara et al.), 1988.

*Primary Examiner*—Ceila Chang
*Attorney, Agent, or Firm*—Wenderoth, Lind & Ponack, L.L.P.

[57] ABSTRACT

A surfactant, an emusifier for emulsion polymerization, a dispersant for suspension polymerization and a modifier for modification of resin properties are disclosed, each of these agents being comprised of a novel compound having a dibasic carboxyl group. The compound is represented by Formula (1)

$$[X-O-(R^1O)_m-OC-R^2-COO]_yM \qquad (1)$$

where M is a hydrogen atom, a metal atom or a quaternary nitrogen-containing group, y is equal to the valence of M, $R^1$ is at least one hydrocarbon group, $R^2$ is a moiety of a dibasic acid or a moiety of its anhydride, m is 0 or an integer of 1 to 1,000, and X is a hydrocarbon group having at least one polymerizable double bond of carbon—ncarbon which may contain an oxygen atom and a fluorine atom.

36 Claims, No Drawings

SURFACTANT, EMULSIFIER FOR EMULSION POLYMERIZATION, DISPERSANT FOR SUSPENSION POLYMERIZATION AND MODIFIER FOR RESIN MODIFICATION

BACKGROUND OF THE INVENTION

1. Field of the Invention

This invention relates to surfactants, emulsifiers for use in emulsion polymerization, dispersants for use in suspension polymerization and modifiers for use in modification of resin properties, with each of these four agents comprised of a compound having a dibasic carboxyl group in its configuration.

2. Description of the Related Art

For their diversified properties such as emulsification, dispersion, cleaning, wetting, frothing and the like, surfactants have heretofore found applications in a wide variety of industrial sectors including textiles, paper, rubber, plastics, metals, paints, pigments, civil engineering, construction and the like. In recent years, moves toward more sophisticated end products using surfactants are becoming particularly active. Along with this, certain secondary defects of surfactants have been recognized.

For instance, such surfactants are absolutely necessary for paint, printing ink and adhesives when these agent products are manufactured, when they are stabilized, or when they are applied. No surfactants need be incorporated in these agents where they are applied by means of coating, printing, adhering or tacking. Conversely, if a surfactant is present in these agents, it is in most instances liable to impair the water resistant and oil resistant properties of the resulting coat, printed surface or adhesive film.

To cope with these problems, attempts have been made to reduce the amount of surfactant to be used and to render it highly polymeric, but only less than satisfactory results have been achieved with respect to the stability and workability properties of the finished product.

Also as emulsifiers for emulsion polymerization, there have been employed anionic surfactants such as alkylsulfuric acid salts, alkylbenzene sulfuric acid salts, polyoxyethylene alkylether sulfuric acid salts an d the like, and nonionic surfactants such as polyoxyethylene alkylethers, polyoxyethylene aliphatic acid esters, Pluronic type surfactants and the like.

As is generally known in the art, an emulsifier for emulsion polymerization takes part not only in the initiation and propagation of polymerization, but also in the mechanical stability, chemical stability, freeze stability and storage stability of the resultant emulsion. Furthermore, the emulsifier has a great effect upon the physical properties of the emulsion such as particle size, viscosity and frothing and upon the physical properties of a film resulting from the emulsion polymer such as water resistance, weathering resistance, adhering bond and thermal stability.

Conventional emulsifiers, however, are responsible for formation of an emulsion that has excessive frothing brought on by the emulsifier and moreover for formation of a film from the emulsion polymer that is poor in adhesiveness and in resistance to water, weather and heat due to the emulsifier remaining in a free state in the film.

In order to eliminate the above-mentioned drawbacks of the emulsifiers in common use, it has recently been developed a reactive surfactant which has an emulsifiable group and a polymerizable group and acts not only as an emulsifier, but also as a surfactant which gradually chemically bonds to a polymer having been formed while in polymerization. For example, Japanese Patent Laid-Open Nos. 7-10909 and 7-18009 are cited on this point. These prior publications disclose carboxylation using chloracetic acid or its salt. Such known reactions lead to reduced reactivity and to increased by-product. Hence, the problems noted hereinabove in connection with the conventional emulsifiers are left unsolved without any significant countermeasures being found.

Dispersants are used for suspension polymerization of vinyl monomers. This mode of polymerization has been widely carried out commercially by dispersing a vinyl monomer in an aqueous medium and subsequently by causing the resultant dispersion to suspension-polymerize in the presence of an oil-soluble catalyst.

The qualities of the polymer products thus obtained are dominated by various polymerizing factors such as polymerization rates, water to monomer ratios, polymerization temperatures, kinds and amounts of catalysts, types of reactors, stirring speeds, and kinds and amounts of dispersants. In particular, the kind of a dispersant to be used, among these factors, is known to have a strong effect upon the polymer qualities.

Dispersants commonly accepted for suspension-polymerizing vinyl monomers include cellulosic derivatives such as methyl cellulose, hydroxypropylmethyl cellulose, carboxyl methyl cellulose and the like, and water-soluble polymers such as gelatin, polyvinyl alcohol and the like.

However, the above listed dispersants tend to remain in free condition in the finished vinyl resins, hence reducing the physical resin properties with respect to water and weather resistance and durability.

On the other hand, a certain modifier for modifying the properties of vinyl resins is known as disclosed in Japanese Patent Laid-Open No. 1-174511. Being less compatible with a monomeric vinyl, this prior art modifier fails to produce a homogeneous copolymer.

As taught by Japanese Patent Laid-Open No. 1-174512, it has also been proposed to improve the compatibility of a resin modifier with a vinyl monomer. However, the modifier described here is not sufficiently compatible with the monomer with less effective modification of the resulting polymer.

SUMMARY OF THE INVENTION

Through intensive research leading to completion of the present invention, the present inventors have found that the foregoing problems of the prior art can be solved or eliminated by the use of specific compounds configured to have a dibasic carboxyl group.

In a first aspect, the invention provides a novel surfactant having a dibasic carboxylic acid structure which does not have the drawbacks discussed hereinbefore.

In a second aspect, the invention provides a novel emulsifier for use in emulsion polymerization which has a dibasic carboxylic acid structure and is free from the above drawbacks.

In a third aspect, the invention provides a novel dispersant for use in suspension polymerization which has a dibasic carboxylic acid structure and is free from the above drawbacks.

In a fourth aspect, the invention provides a novel modifier for use in modification of resin properties which has a dibasic carboxylic acid structure and is free from the above drawbacks.

More specifically, the present invention provides a surfactant, an emulsifier for use in emulsion polymerization, a dispersant for use in suspension polymerization and a modifier for use in modification of resin properties, all of such agents being compounds represented by Formula (1),

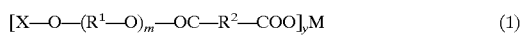  (1)

where M is a hydrogen atom, a metal atom or an ammonium group, y is equal to the valence of M, $R^1$ is one or m ore hydrocarbon groups, $R^2$ is a moiety of a dibasic acid or a moiety of its anhydride, m is 0 or an integer of 1 to 1000, and X is a hydrocarbon group having one or more polymerizable carbon—carbon bonds which may contain an oxygen atom and a fluorine atom.

DETAILED DESCRIPTION OF THE INVENTION

In Formula (1) above, M is a hydrogen atom, a metal atom or a quaternary nitrogen-containing group, i.e., a cationic atom or group. Suitable metal atoms are chosen from alkaline metals such as sodium, potassium and the like, and alkaline earth metals such as magnesium, calcium and the like. Eligible ammonium groups include a ammonium of ammonia, quaternary ammoniums of alkanolamines such as monoethanolamine, triethanolamine and the like, and ammoniums of alkylamines such as monomethylamine, dipropylamine and the like.

In Formula (1) shown above and in Formula (A) described later, $R^1$ and $R^5$ each are one or more hydrocarbon groups which may be of a straight-chained, branch-chained, cyclized, saturated or unsaturated nature. Particularly preferred is an alkylene group of 2 to 4 carbon atoms or a styrene oxide moiety (a phenylethylene group) which may be selected, for example, from ethylene, propylene, butylene, isobutylene, a styrene oxide moiety and the like. $R^1$ and $R^5$ may be the same or different.

The sites of $(R^1—O)_m$ and $(R^5—O)_n$ in Formula (1) and Formula (A) can be derived by additional polymerization of alkylene oxides, styrene oxide and the like such as ethylene oxide, propylene oxide, butylene oxide, epichlorohydrin and the like. $R^1$ and $R^5$ may be determined by alkylene oxide, styrene oxide and the like to be added, and this alkylene oxide, styrene oxide and the like may be added by homopolymerization, random polymerization or block polymerization of two or more different monomers. To that end, any known mode of addition may be put to use. The polymerization degrees, m and n, a re each in the range of 0 to 1,000, preferably of 0 to 500, more preferably 0 to 100, and m and n may be identical or different.

$R^2$ is a dibasic acid or a moiety of its anhydride. Dibasic acids used herein are chose n from saturated aliphatic dicarboxylic acids, such as oxalic acid, malonic acid, succinic acid, glutaric acid, adipic acid, pimelic acid, suberic acid, azelaic acid, sebacic acid, undecanoic diacid, dodecanoic diacid, tridecanoic diacid, tetradecanoic diacid and the like, saturated alicyclic dicarboxylic acids such as cyclopentanedicarboxylic acid, hexahydrophthalic acid, methyl-hexahydrophthalic acid and the like, aromatic dicarboxylic acids such as phthalic acid, isophthalic acid, terephthalic acid, tolylenedicarboxylic acid, xylylendicarboxylic acid and the like, unsaturated aliphatic dicarboxylic acids, such as maleic acid, fumaric acid, itaconic acid, citraconic acid, mesaconic acid and the like, and unsaturated alicyclic dicarboxylic acids, such as tetrahydrophthalic acid, methyltetrahydrophthalic acid, nadic acid (endomethylene tetrahydrophthalic acid), methylnadic acid, methylbutenyl tetrahydrophthalic acid, methylpentenyltetrahydrophthalic acid and the like. These dibasic acids may also be used in anhydride the form.

Of the dibasic acids exemplified above, those having a polymerizable double linkage of carbon—carbon can be easily incorporated into polymer components when they are employed as an emulsifier for emulsion polymerization, a dispersant for suspension polymerization or a modifier for modification of resin properties. Namely, the unsaturated aliphatic dicarboxylic acids such as maleic acid, fumaric acid, itaconic acid, citraconic acid, mesaconic acid and the like, and the unsaturated alicyclic dicarboxylic acids such as tetrahydrophthalic acid, methyl-tetrahydrophthalic acid, nadic acid (endomethylenetetra-hydrophthalic acid), methylnadic acid and the like may be typified.

The substituting group X is a hydrocarbon group having one or more polymerizable double bonds of carbon—carbon which may contain an oxygen atom or a fluorine atom. Here, the double bond may be by nature radically or cationically polymerizable. However, a radical reaction is rather predominant in emulsion and suspension polymerizations, it is preferable to use as the hydrocarbon group for X a radically polymerizable group such as an acryl, methacryl, allyl, methallyl group or the like.

For the substituent X, particularly preferred are groups of Formula (A), Formula (B) and Formula (C), respectively, shown hereunder.

Formula (A) is written as follows:

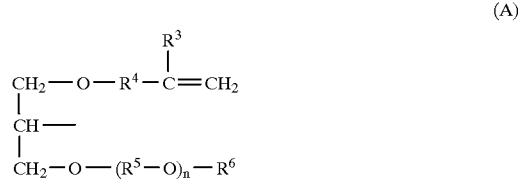 (A)

where $R^3$ is a hydrogen atom or a methyl group, $R^4$ is $CH_2$ or C=O, $R^5$ and n are as defined above in connection with Formula (1), $R^6$ is either a hydrogen atom or one of alkyl, alkenyl, aralkyl and acyl groups which may contain a fluorine atom. The group of Formula (A) is derivable from a ring opening reaction of (meth)allylglycidylether or the like when $R^4$ is $CH_2$, or from a ring opening reaction of glycidyl (meth)acrylate or the like when $R^4$ is C=O.

Formula (B) is written as follows:

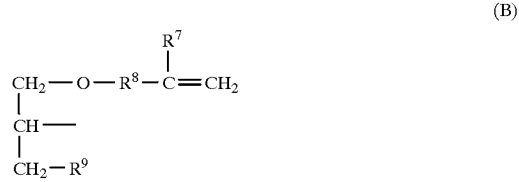 (B)

where $R^7$ is a hydrogen atom or a methyl group, $R^8$ is $CH_2$ or C=O, $R^9$ is either a hydrogen atom or one of alkyl, alkenyl, aralkyl and acyl groups which may contain a fluorine atom. The group of Formula (B) can be obtained by a ring opening reaction of terminated epoxide with (meth) allyl alcohol or the like when $R^8$ is $CH_2$, or from a ring opening reaction of terminated epoxide with (meth)acrylic acid or the like when $R^8$ is C=O.

Formula (C) is written as follows:

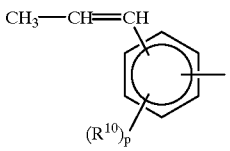
(C)

where $R^{10}$ is one of alkyl, alkenyl, aralkyl and acyl groups which may contain a fluorine atom, and p is 0 or an integer of 1 to 4; that is, $R^{10}$ may not be substituted or may be substituted by a number of 1 to 4. In the case of multiple substitution, each substituting step can be effected individually. The group of Formula (C) is made available with the use of propenylphenol or substituted propenylphenol.

$R^6$, $R^9$ and $R^{10}$ each are a hydrocarbon group in which the hydrogen atom is replaceable by a fluorine atom. Preferred for this hydrocarbon group is an alkyl, alkenyl, aralkyl or acyl group of 1 to 36 in carbon number.

Alkyl groups that may be substituted by a fluorine atom are chosen, for example, from methyl, ethyl, propyl, isopropyl butyl, isobutyl, tertiary butyl, pentyl, isopentyl, neopentyl, tertiary pentyl, hexyl, heptyl, octyl, 2-ethylhexyl, nonyl, decyl, undecyl, dodecyl, tridecyl, isotridecyl, tetradecyl, hexadecyl, octadecyl, docosyl, tetracosyl, triacontyl, 2-octyldodecyl, 2-dodecylhexadecyl, 2-tetradecyloctadecyl, monomethyl-branched isostearyl, tridecafluorooctyl, heptadeca-fluorododecyl, heneicosylfluorododecyl, pentacosyl-fluorododecyl, nonacosylfluorododecyl, tritriacontyl-fluorooctadecyl, 2-pentafluoroethyl pentafluorohexyl, 2-tridecafluorohexyl heneicosylfluorotetradecyl, 2-pentacosylfluorododecyl pentacosylfluorohexadecyl, 2-nonacosylfluorotetradecyl nonacosylfluorooctadecyl groups and the like.

Alkenyl groups that may be substituted by a fluorine atom are chosen, for example, from vinyl, ally, propenyl, isopropenyl, butenyl, isobutenyl, pentenyl, isopentenyl, hexenyl, heptenyl, octenyl, nonenyl, decenyl, undecenyl, dodecenyl, tetradecenyl, oleyl groups and the like.

Aralkyl groups that may be substituted by a fluorine atom are chosen, for example, from phenyl, tolyl, xylyl, cumenyl, mesityl, benzyl, phenethyl, styryl, cinnamyl, benzhydryl, trityl, ethylpheny, propylphenyl, butylphenyl, pentylphenyl, hexylphenyl, hepthylphenyl, octylphenyl, nonylphenyl, alpha-naphtyl, beta-naphtyl groups and the like.

Acyl groups that may be substituted by a fluorine atom are groups selected from the above listed alkyl, alkenyl and aralkyl groups and terminated with a carbonyl group. Typical examples include acetyl, propionyl, butyryl, isobutyryl, valeryl, isovaleryl, pivaloyl, lauroyl, myristoyl, palmitoyl, stearyl, acryloyl, propioryl, methacroyl, crotonoyl, oleyloyl, benzoyl, phthaloyl, succinoyl groups and the like.

To add to the above specified conditions, $R^6$ and $R^9$ each may be a hydrogen atom.

The compounds according to the present invention are suitably useful as surfactants which, owing to their high reactivity in a radical system of polymerization, can also be used as emulsifiers for emulsion polymerization and as dispersants for suspension polymerization and as modifiers for modification of resin properties (adjustments of hydrophilia and improvements in compatibility, static elimination, fog resistance, water resistance, adherability, dyeability, film-forming capability, weather resistance, blocking resistance and the like).

When used as a cleaning agent or as a wetting agent, the compounds of the present invention are conducive to improved amphiphatic capability since they have a carboxylic acid or a salt thereof in the structure.

Advantageously, the compounds of the invention have a polymerizable double bond. When used as an emulsifier for emulsion polymerization and as a dispersant for suspension polymerization, such compounds can solve various problems experienced with conventional unreactive emulsifiers or dispersants, i.e., undesirable frothing in the resulting emulsion or suspension and reduced properties (resistance to water and to weather, adhesiveness and the like) of a polymer derived from the emulsion or suspension polymer as well as drainage load, environmental damage, etc. arising from emulsifiers being contained in the effluent from the production process. Because they are terminated with a carboxylic acid or its salt, the compounds according to the invention contribute to the easy salting-out or acidifying-out required for deposition of a resin from the emulsion or suspension. Further, since these compounds are not present in the waste water drained out during the deposition treatment, they are not cause of drainage load, destruction etc,. This is particularly true when the producing ABS resins.

A further advantage is that when used as an emulsifier for emulsion polymerization, as a dispersant for suspension polymerization and as a modifier for modifying the properties of vinyl resins, the compounds of the invention allow a given resin to crosslink for example in the presence of a metal oxidizer.

When using the surfactant of the present invention as a cleaning agent, $R^2$ is preferably in the range of 8 to 24 in carbon number, and m is preferably in the range of 1 to 100. The amount of the surfactant to be used is in the range of 0.01 to 10% by weight, preferably 0.1 to 5% by weight.

When using the surfactant of the invention as a wetting agent, $R^2$ is preferably in the range of 8 to 24 in carbon number, and m is preferably in the range of 1 to 100. The amount of the surfactant to be used is in the range of 0.01 to 10% by weight, preferably 0.1 to 5% by weight.

When using the emulsifier of the present invention for emulsion polymerization, $R^2$ is preferably in the range of 1 to 24 in carbon number, and m is preferably in the range of 1 to 100.

A radical polymerization system is suited for adaptation to the emulsifier of the invention for emulsion polymerization. Homo- and co-polymers which result from various monomers illustrated below are preferred. Examples of the monomers include vinyl compounds such as, vinyl acetate, vinyl propionate, alkylvinyl ether and the like, acryl compounds such as acrylic acid, methyl acrylate, methyl methacrylate, butyl acrylate, 2-ethylhexyl acrylate, glycidyl acrylate, acrylonitrile, acrylamide and the like, aromatic vinyl compounds such as, styrene, alpha-methylstyrene, vinyl toluene and the like, alpha-olefin compounds such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like, conjugated dienes such as, butadiene, isoprene, pentadiene and the like, halogenated olefin compounds such as vinyl chloride, vinylidene chloride and the like, maleic anhydride, maleic acid esters, itaconic acid esters, acrylonitrile-butadiene-styrene latices (ABS latices), styrene-butadiene latices (SBR latices), acryl emulsions, acryl-styrene emulsions and the like.

The amount of the emulsifier of the invention used may be the same as that of the known emulsifier and is generally in the range of 0.1 to 20% by weight, preferably of 0.2 to 10% by weight, based on the weight of the starting monomer. This emulsifier can be used in combination with another different emulsifier.

When using the emulsifier of the present invention for emulsion polymerization, $R^2$ is preferably in the range of 1 to 24 in carbon number, and m is preferably in the range of 1 to 100.

For adaptation to the dispersant of the invention for suspension polymerization, vinyl chloride type monomers can be suitably polymerized. Homo- and co-polymers which result from various monomers illustrated below are preferred. Examples of the monomers include vinyl compounds such as, vinyl acetate, vinyl propionate, alkylvinyl ether, alkylvinyl ketone and the like, acryl compounds such as, acrylic acid, methyl acrylate, methyl methacrylate, acrylonitrile, acrylamide and the like, alpha-olefin compounds such as, ethylene, propylene, 1-butene, 1-pentene, 1-hexene, 1-heptene, 1-octene, 1-nonene, 1-decene, 1-undecene, 1-dodecene, 1-tridecene, 1-tetradecene and the like, conjugated dienes, such as butadiene, isoprene, pentadiene and the like, halogenated olefin compounds, such as vinyl chloride, vinylidene chloride and the like, maleic anhydride, maleic acid esters, itaconic acid esters and the like.

The amount of the dispersant of the invention used may be the same as that of the known emulsifier and is generally in the range of 0.1 to 20% by weight, preferably of 0.2 to 10% by weight, based on the weight of the starting monomer. This dispersant can be used in combination with another different dispersant so long as the former is not adversely affected in performance by the latter.

When using the modifier of the present invention for modifying resin properties, $R^2$ is preferably in the range of 1 to 24 in carbon number, and m is preferably in the range of 1 to 10.

Homopolymers or copolymers of a vinyl type which are obtained from different momomers illustrated below are suited for adaptation to the modifier of the invention for property modification. Examples of the monomers include vinyl compounds such as, vinyl acetate, vinyl propionate, alkylvinyl ether, alkylvinyl ketone and the like, acryl compounds such as, acrylic acid, methyl methacrylate, acrylonitrile, acrylamide and the like, alpha-olefin compounds such as, ethylene, propylene, 1-butene, 1-pentene, 1-hexene, 1-heptene, 1-octene, 1-nonene, 1-decene, 1-undecene, 1-dodecene, 1-tridecene, 1-tetradecene and the like, conjugated dienes such as butadiene, isoprene, pentadiene and the like, halogenated olefin compounds such as, vinyl chloride, vinylidene chloride and the like, maleic anhydride, maleic acid esters, itaconic acid esters and the like. This modifier can be added to the reaction system when a selected monomer or monomers are homo- or co-polymerized, or to the finished polymer when the same is processed.

In the case where the modifier of the invention is prepared with use of an ether chain-containing compound, it offers excellent compatibility with the corresponding polymer. Where it has $(R^1—O)_m$ and $(R^5—O)_n$, this modifier enables the hydrophilia of a given polymer to be easily adjustable by selecting the chain length of and the kind of the associated alkylene oxide depending on the purpose of modification and on the compatibility with the corresponding monomer or monomers.

The resin modifier of the invention, therefore, is capable of simultaneously attaining improved compatibility with monomers and improved modification of resin properties.

With the use of the modifier according to the invention, the resulting resin becomes permanently anti-static and fog-resistant in nature.

The amount of the modifier used, though variable with the kind of monomers as well as the purpose of modification and the requirement of performance, is generally in the range of 0.1 to 80% by weight. In particular, in order to make insufficiently hydrophilic water-soluble polymers highly hydrophilic, it is preferable to use the modifier in an amount of 1 to 80% by weight based on the weight of a given monomer.

To enhance other properties, for example, water resistance, adhesiveness, destaticization, fogging resistance, dyeability, film-forming capability, weathering resistance, blocking resistance and the like and to impart compatibility to polymers for formation of polymer alloys, the modifier is preferably used in an amount of 0.1 to 60% by weight based on the weight of a given monomer.

When using the modifier according to the invention, crosslinkable divinyl compounds such as divinylbenzene, ethyleneglycol dimethacrylate, methylene bis-acrylamide and the like may be employed in commonly accepted amounts so as to enhance polymer properties.

The compounds of Formula (1) according to the present invention are producible with utmost ease by reaction of a compound in which a hydroxyl group is bonded to a terminal end of the substitutent X, i.e., X—OH, and a dibasic acid or an anhydride thereof with stirring at from 35 to 120° C., preferably from 40 to 100° C., for 2 to 6 hours. Any suitable catalyst can be used where desired. The substituting group M of the compound obtained here is a hydrogen atom which may be subsequently neutralized to an alkaline metal, alkaline earth metal, ammonium, alkylammonium or alkanolammonium or the like. In such instance, there may be utilized alkaline metal compounds such as sodium hydroxide, potassium hydroxide and the like, alkaline earth metal compounds such as calcium hydroxide and the like, ammonia alkanolamines such as, monoethanolamine, diethanolamine and the like, and alkylamines such as monomethylamine, diethylamine, dimethylamine and the like.

The above method of synthesizing the compounds of Formula (1) according to the invention should be regarded as solely illustrative but not restrictive.

EXAMPLES

The present invention will be described in more detail with reference to the following examples.

EO, PO, BO and SO appearing hereinbelow denote the following:

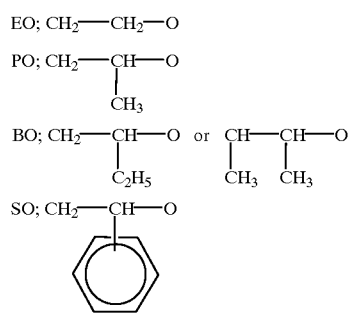

Production Reference A:

One mol of a compound of the following formula

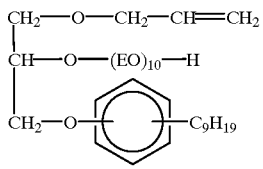

was put into a 4-necked flask equipped with a stirrer, and the temperature was elevated to 50° C., followed by charging of 1 mol of maleic anhydride. Stirring was conducted at 50° C. for 2 hours and further at 70° C. for 1 hour, after which a compound of 64.8 mg KOH/g in acid value was prepared, Neutralization of the resultant compound with NaOH gave compound (A).

Production Reference B:

One mol of a compound of the following formula

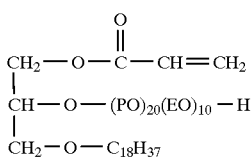

was placed in a 4-necked flask equipped with a stirrer, and the temperature was elevated to 50° C., followed by charging of 1 mol of maleic anhydride. Stirring was conducted at 50° C. for 2 hours and further at 70° C. for 1 hour to thereby prepare a compound having an acid value of 27.5 mg KOH/g. Subsequent neutralization of the resulting compound with KOH provided compound (B).

Production Reference C:

One mol of a compound of the following formula

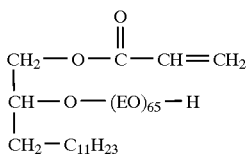

was placed in a 4-necked flask equipped with a stirrer, and the temperature was elevated to 60° C., followed by charging of 1 mol of phthalic anhydride. Stirring was conducted at 60° C. for 2 hours and further at 80° C. for 2 hours to thereby prepare a compound of 17.3 mg KOH/g in acid value. The resulting compound was then neutralized with ammonia into compound (C).

Production Reference D:

One mol of a compound of the following formula

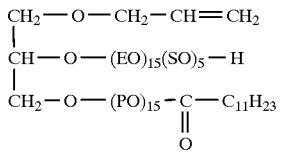

was put into a 4-necked flask equipped with a stirrer, and 1 mol of succinic anhydride was then charged with the temperature elevated to 60° C. The reactive mixture was stirred at 60° C. for 2 hours and further at 80° C. for 2 hours, thereby preparing a compound of 32.6 mg KOH/g in acid value which was subsequently neutralized with NaOH into compound (D).

Production Reference E:

One mol of a compound of the following formula

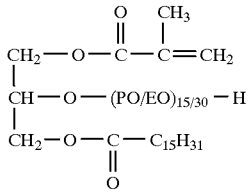

was put into a 4-necked flask equipped with a stirrer, and 1 mol of citraconic acid was then charged with the temperature elevated to 50° C. Stirring was conducted at 50° C. for 2 hours and further at 70° C. for 3 hours, thereby preparing a compound of 21.1 mg KOH/g in acid value which was thereafter neutralized with monoethanolamine into compound (E)(PO/EO indicates a random polymer of propylene oxide and ethylene oxide).

Production Reference F:

One mol of a compound of the following formula

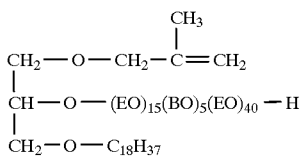

was placed in a 4-necked flask equipped with a stirrer, and the temperature was elevated to 60° C., followed by charging of 1 mol of hexahydrophthalic anhydride. Stirring was done at 60° C. for 2 hours and further at 90° C. for 4 hours to thereby prepare a compound having an acid value of 17.5 mg KOH/g. Subsequent neutralization of the resultant compound with dimethylamine provided compound (F).

Production Reference G:

One mol of a compound of the following formula

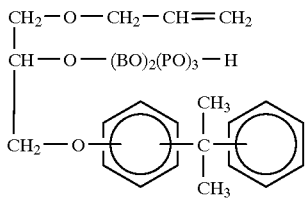

was put into a 4-necked flask equipped with a stirrer, and 1 mol of tetrahydrophthalic anhydride was then charged with the temperature elevated to 40° C. The reactive mixture was stirred at 40° C. for 3 hours and further at 60° C. for 2 hours to thereby prepare a compound of 76.5 mg KOH/g in acid value which was subsequently neutralized with dimethylamine into compound (G).

Production Reference H:
One mol of a compound of the following formula

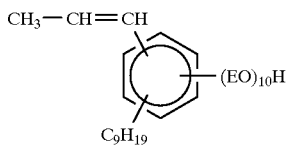

was put into a 4-necked flask equipped with a stirrer, and 1 mol of maleic anhydride was then charged with the temperature elevated to 50° C. The reactive mixture was stirred at 50° C. for 2 hours and further at 70° C. for 2 hours to thereby prepare a compound of 72.3 mg KOH/g in acid value which was subsequently neutralized with NaOH into compound (H).

Production Reference I:
One mol of a compound of the following formula

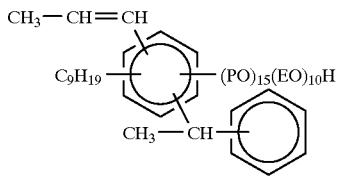

was placed in a 4-necked flask equipped with a stirrer, and the temperature was elevated to 40° C., followed by charging of 1 mol of phthalic anhydride. Stirring was conducted at 40° C. for 2 hours and further at 70° C. for 3 hours to thereby prepare a compound of 31.6 mg KOH/g in acid value which was subsequently neutralized with NaOH into compound (I).

Production Reference J:
One mol of a compound of the following formula

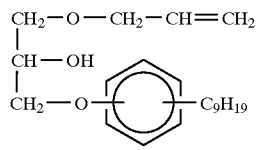

was put into a 4-necked flask equipped with a stirrer, and 1 mol of maleic anhydride was then charged with the temperature elevated to 50° C. The reactive mixture was stirred at 50° C. for 2 hours and further at 70° C. for 1 hour to thereby prepare compound (J) of 72.1 mg KOH/g in acid value.

The structural formulae of inventive compounds (A) to (J) obtained above are shown in Tables 1-1 and 1-2.

TABLE 1

| Compound | |
|---|---|
| (A) | 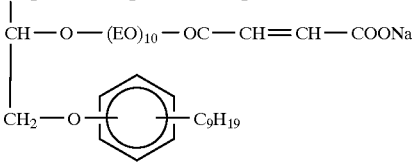 |
| (B) | 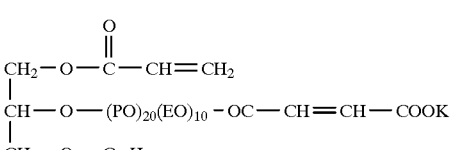 |
| (C) | 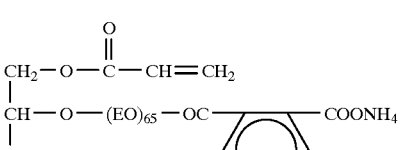 |
| (D) | 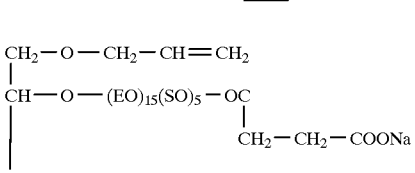 |

TABLE 1-continued

| Compound | |
|---|---|
| (E) | $CH_2-O-\overset{O}{\underset{\|}{C}}-\overset{CH_3}{\underset{\|}{C}}=CH_2$ <br> $CH-O-(PO/EO)_{15/30}-OC-\overset{CH_3}{\underset{\|}{C}}=CH$ <br> $CH_2-O-\overset{\|}{\underset{O}{C}}-C_{15}H_{31}$     $\overset{\|}{COONH_2}$ <br>                                                                                         $C_2H_4OH$ <br><br> or <br><br> $CH_2-O-\overset{O}{\underset{\|}{C}}-\overset{CH_3}{\underset{\|}{C}}=CH_2$ <br> $CH-O-(PO/EO)_{15/30}-OC-\overset{H}{\underset{\|}{C}}=\overset{CH_3}{\underset{\|}{C}}$ <br> $CH_2-O-\overset{\|}{\underset{O}{C}}-C_{15}H_{31}$     $\overset{\|}{COONH_2}$ <br>                                                                                         $C_2H_4OH$ |
| (F) | $CH_2-O-CH_2-\overset{CH_3}{\underset{\|}{C}}=CH_2$ <br> $CH-O-(EO)_{15}(BO)_5(EO)_{40}-OC-\underset{(CH_3)HNOOC}{\text{cyclohexyl}}$ <br> $CH_2-O-C_{18}H_{37}$ |
| (G) | $CH_2-O-CH_2-CH=CH_2$ <br> $CH-O-(BO)_2(PO)_3-OC-\underset{COON(CH_3)_2}{\overset{\text{cyclohexenyl}}{\phantom{X}}}\;H$ <br> $CH_2-O-\text{Ph}-\overset{CH_3}{\underset{CH_3}{C}}-\text{Ph}$ |
| (H) | $CH_3-CH=CH-\underset{C_9H_{19}}{\text{Ph}}-(EO)_{10}-OC-CH=CH-COONa$ |
| (I) | $CH_3-CH=CH-\underset{\underset{CH_3-CH-\text{Ph}}{C_9H_{19}}}{\text{Ph}}-(PO)_{10}(EO)_{10}-OC-\text{Ph}-COONa$ |
| (J) | $CH_2-O-CH_2-CH=CH_2$ <br> $CH-OOC-CH=CH-COOH$ <br> $CH_2-O-\text{Ph}-C_9H_{19}$ |

As comparative compounds, several known surfactants, emulsifiers for emulsion polymerization, dispersants for suspension polymerization and modifiers for modification of resin properties are given below which are all devoid of the specific carboxyl group according to the invention. Comparative Compound (1):

One mol of a compound of the following formula

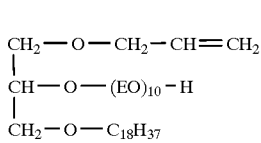
(D)

was calboxylated by the methods disclosed in Japanese Patent Laid-Open Nos. 7-18009 and 7-10909. Sodium chloride was formed as a secondary product which was thereafter removed by filtration. The resulting compound contained 73% of a carboxylated fraction and 27% of an unreacted fraction of (D).

Comparative Compound (2):

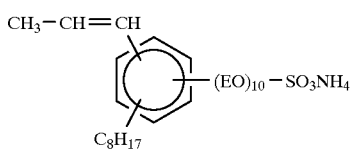

Comparative Compound (3):

Comparative Compound (4):

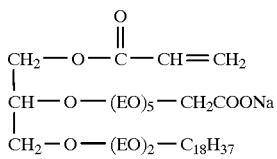

The preparation was done in accordance with the method disclosed in Japanese Patent Laid-Open No. 7-18011.

Comparative Compound (5):

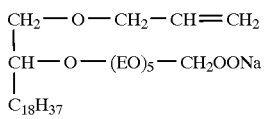

The preparation was done in accordance with the method disclosed in Japanese Patent Laid-Open No. 7-18009.

Comparative Compound (6):

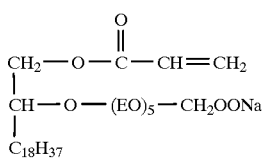

The preparation was done in accordance with the method disclosed in Japanese Patent Laid-Open No. 7-10909.

Comparative Compound (7):

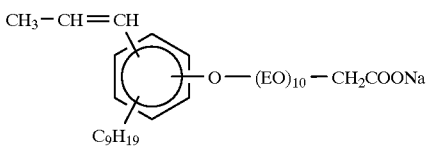

The preparation was done in accordance with the method disclosed in Japanese Patent Laid-Open No. 7-248005.

Example 1

Inventive surfactants (A) to (J) and comparative compounds (1) to (7) were measured in regard to their respective dispersibilities of carbon black with the results shown in Table 2. Measurement was made by a test method indicated below.

Dispersibility

Into a graduated cylinder having a volume of 100 ml and provided with a ground-glass stopper were put 1 g of the surfactant and 10 g of carbon black. The whole was dispersed in water and adjusted to 100 ml.

The cylinder was shaken 100 times for 1 minute and let stand at 25° C. for 1 hour. Out of the liquid level in the cylinder was taken a fraction of 30 cc which was thereafter filtered with a glass filter, followed by drying of a residue on the filter at 105° C. The property of dispersibility was determined from the weight of the dry residue by the following equation.

dispersibility(%)=[weight (g) of residue on glass filter]/3(g)×100

TABLE 2

|  | Dispersibility % |
|---|---|
| Inventive compound | |
| (A) | 97 |
| (B) | 93 |
| (C) | 94 |
| (D) | 93 |
| (E) | 91 |
| (F) | 94 |
| (G) | 96 |
| (H) | 92 |
| (I) | 95 |
| (J) | 91 |
| Comparative compound (1) | 72 |
| Comparative compound (2) | 83 |
| Comparative compound (3) | 55 |
| Comparative compound (4) | 85 |
| Comparative compound (5) | 84 |
| Comparative compound (6) | 81 |
| Comparative compound (7) | 83 |

Example 2

Inventive emulsifiers (A) to (J) and comparative compounds (1) to (7) were used to emulsion-polymerize styrene, butadiene and acrylonitrile monomers. Measurement was made of the resultant emulsion polymers for mechanical stability and frothing and acidifying out Polymerization Process A high-pressure reactor internally replaced with a nitrogen gas was charged with 110 g of water in which was then dissolved 4.0 g of each of inventive emulsifiers (A) to (J) and comparative compounds (1) to (7). After further addition of 1 g of potassium persulfate, 90 g of butadiene was fed over a length of time of 5 hours. Subsequent maturation produced a polybutadiene latex.

The resulting latex was incorporated with 150 g of water in which was then dissolved 2.0 g of each of inventive emulsifiers (A) to (J) and comparative compounds (1) to (7). After its internal replacement with a nitrogen gas, the reactor was charged with 0.5 g of potassium persulfate. Feeding was continued of a monomeric mixture of 40 g of styrene and 10 g of acrylonitrile over a passage of 2 hours. After maturation for 4 hours, a polymeric ABS latex was obtained.

Example 3

Inventive emulsifiers (A) to (J) and comparative compounds (1) to (7) were used to emulsion-polymerize a methyl acrylate monomer. Examination of the resulting emulsion polymers was made in regard to mechanical stability and frothing and of films made from such emulsion polymers in regard to water resistance.

Polymerization Process

Water in an amount of 120 g was put into a reactor equipped with a reflux condenser, a stirrer, a dropping funnel and a thermometer that was replaced with a nitrogen gas. Separately, 4 g of each of inventive emulsifiers (A) to (J) and comparative compounds (1) to (7) was dissolved in 80 g of the methyl acrylate monomer, and 8.4 g of the resultant monomer-emulsifier mixture was charged into the reactor together with 0.08 g of potassium persulfate and 0.04 g of sodium bisulfite. The polymerization was initiated at 50° C. with the remaining monomer-emulsifier mixture added continuously dropwise to the reactor over a passage of 2 hours. Maturation for 2 hours produced an emulsion.

Performance evaluation was made, under the set of conditions indicated below, of the resins obtained in Examples 2 and 3.

(1) Mechanical Stability

By the use of a Malon stability tester, 50 g of the emulsion was subjected to rotation for 5 minutes under conditions of 1000 rpm per 10 kg. The aggregate thus formed was filtered on a wire screen of 100 meshes in gauze, and the resultant residue on the screen was washed with water and dried at 105° C. for 2 hours. The weight of the dry residue is expressed by weight percentage in terms of the solid content.

(2) Frothing

The emulsion-was diluted double with water, and 200 ml of the diluted emulsion was put into a graduated test tube of 100 ml in volume. The height of frothing was measured and adjudged in terms of ml when up-and-down shaking was vigorously effected.

(3) Water Resistance for Film

Evaluation was made of the time required for a polymeric film of 0.2 mm in thickness to whiten by water immersion testing.

◎: over 1 day
o: longer than 1 hour
x: shorter than 1 hour (4) Acidifying-Out

The ABS emulsion in an amount of 100 g was incorporated with 10 ml of 1N-hydrochloric acid, followed by stirring of the mixture at 50° C. for 5 minutes and by subsequent standing of the mixture. The ABS resin was checked for its aggregation as follows:

◎: completely aggregated with clear supernatant
o: partly aggregated with cloudy supernatant
x: not aggregated at all The test results obtained for Example 2 are listed in Table 3 and those for Example 3 in Table 4.

TABLE 3

| Emulsifier | Mechanical stability (%) | Frothing (ml) Immediately after shaking | After 1 min | After 5 min | Acidifying out |
|---|---|---|---|---|---|
| Inventive compound | | | | | |
| (A) | 13.5 | 10 | 3 | 1 | ◎ |
| (B) | 12.8 | 12 | 5 | 1 | ◎ |
| (C) | 10.7 | 15 | 10 | 4 | ◎ |
| (D) | 15.5 | 12 | 7 | 3 | ◎ |
| (E) | 13.0 | 13 | 6 | 1 | ◎ |
| (F) | 14.1 | 14 | 3 | 2 | ◎ |
| (G) | 15.6 | 16 | 9 | 5 | ◎ |
| (H) | 12.8 | 11 | 8 | 6 | ◎ |
| (I) | 15.4 | 18 | 10 | 3 | ◎ |
| (J) | 16.3 | 17 | 10 | 3 | ◎ |
| Comparative compound (1) | 29.6 | 26 | 15 | 10 | x |
| Comparative compound (2) | 20.1 | 23 | 11 | 9 | x |
| Comparative compound (3) | 23.6 | 46 | 40 | 38 | x |
| Comparative compound (4) | 20.9 | 25 | 13 | 9 | o |
| Comparative compound (5) | 19.9 | 26 | 15 | 8 | o |
| Comparative compound (6) | 21.3 | 22 | 14 | 8 | o |
| Comparative compound (7) | 20.4 | 23 | 14 | 8 | o |

TABLE 4

| Emulsifier | Mechanical stability (%) | Frothing (ml) Immediately after shaking | After 1 min | After 5 min | Water resistance |
|---|---|---|---|---|---|
| Inventive compound | | | | | |
| (A) | 10.5 | 12 | 5 | 1 | ◎ |
| (B) | 13.9 | 14 | 6 | 2 | ◎ |
| (C) | 11.7 | 11 | 9 | 8 | ◎ |
| (D) | 12.8 | 15 | 4 | 1 | ◎ |
| (E) | 15.1 | 13 | 5 | 2 | ◎ |
| (F) | 12.8 | 14 | 6 | 2 | ◎ |
| (G) | 11.6 | 18 | 8 | 4 | ◎ |
| (H) | 12.9 | 13 | 9 | 3 | ◎ |
| (I) | 15.4 | 18 | 12 | 8 | ◎ |
| (J) | 14.3 | 15 | 9 | 2 | ◎ |
| Comparative compound (1) | 26.3 | 21 | 15 | 13 | x |
| Comparative compound (2) | 24.3 | 14 | 11 | 9 | x |
| Comparative compound (3) | 20.3 | 46 | 30 | 28 | o |
| Comparative compound (4) | 22.3 | 25 | 16 | 10 | x |
| Comparative compound (5) | 19.4 | 26 | 19 | 9 | x |
| Comparative compound (6) | 22.5 | 22 | 21 | 11 | x |
| Comparative compound (7) | 21.8 | 23 | 15 | 12 | x |

Example 4

A glass-lined autoclave of 150 liters in volume was charged with 150 g of demineralized water and 2 g of each of inventive dispersants (A) to (J) and comparative compounds (1) to (7) and 0.2 part by weight of di-2-ethylhexylperoxy carbonate. Deaeration was conducted up to 5.0 mm Hg so as to remove oxygen from the autoclave, followed by addition of 100 parts by weight of monomeric vinyl chloride. The polymerization was effected with stirring at 500 rpm and at 57° C.

The pressure in the autoclave was 8.0 kg/cmG at the time the reaction was initiated, but that pressure got dropped to 4.0 kg/cmG after a lapse of 7 hours at which time the reaction was brought to an end. Unreacted monomer was purged, while the contents were taken out for dewatering and drying.

The resin obtained in Example 4 was tested under the conditions given below and with the results shown in Table 5.

(1) Particle Size

Dry sieve analysis was followed by means of Tyler wire sieves.

(2) Water Resistance

A polyvinyl chloride film of 0.5 mm in thickness was prepared which was then immersed in warm water at 50° C. Determination was made of the time required for the film to whiten.

TABLE 5

| | Particle size | Water resistance |
|---|---|---|
| Inventive compound | | |
| (A) | 0 | ⊚ |
| (B) | 0 | ⊚ |
| (C) | 0 | ⊚ |
| (D) | 0 | ⊚ |
| (E) | 0 | ⊚ |
| (F) | 0 | ⊚ |
| (G) | 0 | ⊚ |
| (H) | 0 | ⊚ |
| (I) | 0 | ⊚ |
| (J) | 0 | ⊚ |
| Comparative compound (1) | 10 wt % | x |
| Comparative compound (2) | 15 wt % | x |
| Comparative compound (3) | 21 wt % | o |
| Comparative compound (4) | 7 wt % | x |
| Comparative compound (5) | 6 wt % | x |
| Comparative compound (6) | 8 wt % | x |
| Comparative compound (7) | 8 wt % | x |

Example 5

Into a reactor equipped with a reflux condenser, a stirrer, a dropping funnel and a thermometer was charged 100 g of xylene, and the reactive system was replaced with a nitrogen gas.

A solution was individually prepared which had mixed together 150 g of styrene, 7.5 g of each of inventive resin modifiers (A) to (J) and comparative compounds (1), (4), (5), (6) and (7), 2 g of benzoyl peroxide and 1 g of di-tert.-butyl peroxide. This solution was added continuously dropwise to the reactor at 130° C. over a passage of 2 hours. Moreover, a mixed solution of 10 g of xylene, 0.5 g of benzoyl peroxide and 0.5 g of di-tert-butyl peroxide was added dropwise, and the reaction was continued for 2 hours. Upon subsequent cooling and addition of 90 g of xylene, a polymeric solution was provided.

Example 6

Into a reactor equipped with a reflux condenser, a stirrer, a dropping funnel and a thermometer was charged 100 g of xylene, and the reactive system was replaced with a nitrogen gas.

A solution was individually prepared which had mixed together 75 g of 2-ethylhexyl acrylate, 75 g of meth-acrylic acid, 15 g of each of inventive resin modifiers (A), (C), (E), (G) and (I) and comparative compounds (1), (4), (5), (6) and (7), 2 g of benzoyl peroxide and 0.5 g of di-tert-butyl peroxide. This solution was continuously added dropwise to the reactor at 130° C. over a passage of 2 hours. Further addition was done dropwise of a mixed solution of 10 g of xylene, 0.5 g of benzoyl peroxide and 0.5 g of di-tert.-butyl peroxide, and the reaction was continued for 2 hours. Subsequent cooling and addition of 90 g of xylene provided a polymeric solution.

Polymer films each of 0.2 mm in thickness were formed in conventional fashion from the polymeric solutions obtained in Examples 5 and 6. Fogging resistance and de-staticization were examined under the conditions indicated below with the results listed in Table 6.

(1) Fogging Resistance

The contact angle of water was measured with respect to the film.

(2) Destaticization for Film

The surface specific resistance of the film was determined upon standing of the latter at a temperature of 20° C. and at a humidity of 35% for 24 hours.

TABLE 6

| Modifier | Contact angle (°) | Surface specific resistance (Ω) |
|---|---|---|
| Example 5 | | |
| (A) | 26.3 | $2.8 \times 10^{10}$ |
| (B) | 27.8 | $1.5 \times 10^{10}$ |
| (C) | 25.9 | $2.7 \times 10^{10}$ |
| (D) | 26.2 | $2.7 \times 10^{10}$ |
| (E) | 26.2 | $2.7 \times 10^{10}$ |
| (F) | 27.8 | $3.9 \times 10^{10}$ |
| (G) | 26.5 | $1.0 \times 10^{10}$ |
| (H) | 27.6 | $2.0 \times 10^{10}$ |
| (I) | 27.2 | $1.5 \times 10^{10}$ |
| (J) | 27.0 | $2.9 \times 10^{10}$ |
| Comparative compound 1 | 32.3 | $4.8 \times 10^{11}$ |
| Comparative compound 4 | 33.3 | $3.9 \times 10^{11}$ |
| Comparative compound 5 | 32.5 | $4.2 \times 10^{11}$ |
| Comparative compound 6 | 32.1 | $3.6 \times 10^{11}$ |
| Comparative compound 7 | 33.7 | $4.5 \times 10^{11}$ |
| Example 6 | | |
| (A) | 23.8 | $1.3 \times 10^{10}$ |
| (C) | 22.5 | $2.4 \times 10^{10}$ |
| (E) | 22.3 | $2.8 \times 10^{10}$ |
| (G) | 21.9 | $1.5 \times 10^{10}$ |
| (I) | 23.0 | $2.7 \times 10^{10}$ |
| Comparative compound 1 | 33.1 | $1.6 \times 10^{11}$ |
| Comparative compound 4 | 32.2 | $2.4 \times 10^{11}$ |
| Comparative compound 5 | 30.7 | $3.5 \times 10^{11}$ |
| Comparative compound 6 | 31.8 | $1.2 \times 10^{11}$ |
| Comparative compound 7 | 31.6 | $3.8 \times 10^{11}$ |

Example 7

Polypropylene pellets in an amount of 100 g and 5 g of each of inventive resin modifiers (A) to (J) and comparative compounds (1), (4), (5), (6) and (7) were kneaded at 210° C. for 30 minutes, followed by casting of the kneaded polymer using 10 cm×10 cm×5 mm mold. Thus, a specimen was prepared.

Example 8

Polystyrene pellets in an amount of 100 g and 10 g of each of inventive resin modifiers (A) to (J) and comparative compounds (1), (4), (5), (6) and (7) were kneaded at 210° C. for 30 minutes, followed by casting of the kneaded polymer using 10 cm×10 cm×5 mm mold. Thus, a specimen was prepared.

The specimens obtained in Examples 7 and 8 were tested as in Examples 5 and 6 in respect of fogging resistance and destaticization with the results listed in Table 7.

TABLE 7

| Modifier | Contact angle (°) | Surface specific resistance (Ω) |
| --- | --- | --- |
| Example 7 | | |
| (A) | 30.1 | $5.7 \times 10^{10}$ |
| (B) | 29.2 | $6.7 \times 10^{10}$ |
| (C) | 30.9 | $5.1 \times 10^{10}$ |
| (D) | 28.5 | $5.6 \times 10^{10}$ |
| (E) | 29.4 | $6.4 \times 10^{10}$ |
| (F) | 30.3 | $7.7 \times 10^{10}$ |
| (G) | 29.0 | $5.8 \times 10^{10}$ |
| (H) | 30.8 | $5.4 \times 10^{10}$ |
| (I) | 29.6 | $5.0 \times 10^{10}$ |
| (J) | 28.3 | $4.7 \times 10^{10}$ |
| Comparative compound 1 | 36.3 | $9.8 \times 10^{11}$ |
| Comparative compound 4 | 35.2 | $9.2 \times 10^{11}$ |
| Comparative compound 5 | 35.9 | $8.3 \times 10^{11}$ |
| Comparative compound 6 | 37.8 | $6.5 \times 10^{11}$ |
| Comparative compound 7 | 38.4 | $8.5 \times 10^{11}$ |
| Example 8 | | |
| (A) | 28.3 | $6.0 \times 10^{10}$ |
| (B) | 30.1 | $6.9 \times 10^{10}$ |
| (C) | 27.3 | $5.3 \times 10^{10}$ |
| (D) | 30.3 | $4.3 \times 10^{10}$ |
| (E) | 29.5 | $5.1 \times 10^{10}$ |
| (F) | 29.0 | $4.5 \times 10^{10}$ |
| (G) | 30.9 | $5.8 \times 10^{10}$ |
| (H) | 28.9 | $6.5 \times 10^{10}$ |
| (I) | 29.0 | $5.3 \times 10^{10}$ |
| (J) | 28.4 | $4.8 \times 10^{10}$ |
| Comparative compound 1 | 35.5 | $8.8 \times 10^{11}$ |
| Comparative compound 4 | 37.5 | $7.4 \times 10^{11}$ |
| Comparative compound 5 | 35.8 | $8.1 \times 10^{11}$ |
| Comparative compound 6 | 37.3 | $7.2 \times 10^{11}$ |
| Comparative compound 7 | 36.2 | $9.7 \times 10^{11}$ |

An advantage of the present invention lies in the provision of a novel surfactant. Another advantage of the invention lies in providing a novel emulsifier for emulsion polymerization. A further advantage of the invention lies in providing a novel dispersant for suspension polymerization. Still another advantage of the invention lies in providing a novel modifier for modification of resin properties.

What is claimed is:

1. A surfactant comprising a compound represented by Formula (1)

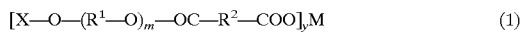

wherein M is a hydrogen atom, a metal atom or an ammonium group, y is equal to the valence of M, $R^1$ is at least one hydrocarbon group, $R^2$ is a $C_{1-24}$ divalent hydrocarbon linker that is obtained by removing both carboxylic groups from a dibasic acid consisting essentially of carbon, hydrogen and oxygen, m is 0 or an integer of 1 to 1,000, and X is an allyl or methallyl group.

2. The surfactant according to claim 1, wherein $R^2$ is a saturated aliphatic hydrocarbon, a saturated alicyclic hydrocarbon, an aromatic hydrocarbon, an unsaturated aliphatic hydrocarbon or an unsaturated alicyclic hydrocarbon.

3. The surfactant according to claim 1, wherein $R^2$ is a residue that is obtained by removing the carboxylic groups from a dibasic acid selected from the group consisting of oxalic acid, malonic acid, succinic acid, glutaric acid, adipic acid, pimelic acid, suberic acid, azelaic acid, sebacic acid, undecanoic diacid, dodecanoic diacid, tridecanoic diacid, tetradecanoic diacid, cyclopentanedicarboxylic acid, hexahydrophthalic acid, methylhexahydrophthalic acid, phthalic acid, isophthalic acid, terephthalic acid, tolylenedicarboxylic acid, xylylendicarboxylic acid, maleic acid, fumaric acid, itaconic acid, citraconic acid, mesaconic acid, tetrahydrophthalic acid, methyltetrahydrophthalic acid, nadic acid, methylnadic acid, methylbutenyl tetrahydrophthalic acid and methylpentenyltetrahydrophthalic acid.

4. The surfactant according to claim 1, wherein M in Formula (1) is selected from the group consisting of a hydrogen atom, an alkaline metal atom, an alkaline earth metal atom, an ammonium of ammonia, an ammonium of an alkanolamine and an ammonium of an alkylamine.

5. The surfactant according to claim 1, wherein $R^1$ is at least one alkylene group having 2 to 4 carbon atoms or a phenylethylene group.

6. The surfactant according to claim 1, wherein $R^2$ has at least one polymerizable carbon-carbon double bond.

7. An emulsifier for use in emulsion polymerization, comprising a compound defined in claim 1.

8. A dispersant for use in suspension polymerization, comprising a compound defined in claim 1.

9. A modifier for use in modification of resin properties, comprising a compound defined in claim 1.

10. A surfactant comprising a compound represented by Formula (1)

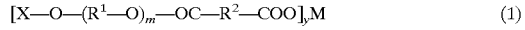

wherein M is a hydrogen atom, a metal atom or an ammonium group, y is equal to the valence of M, $R^1$ is at least one hydrocarbon group, $R^2$ is a $C_{1-24}$ divalent hydrocarbon linker that is obtained by removing both carboxylic groups from a dibasic acid consisting essentially of carbon, hydrogen and oxygen, m is 0 or an integer of 1 to 1,000, and X is represented by Formula (A)

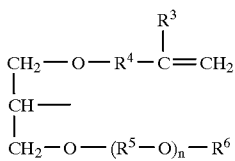

wherein $R^3$ is a hydrogen atom or a methyl group, $R^4$ is $CH_2$ or C=O, $R^5$ is at least one hydrocarbon group, $R^6$ is selected from the group consisting of a hydrogen atom, alkyl, alkenyl, aralkyl, acyl, fluorine substituted alkyl, fluorine substituted alkenyl, fluorine substituted aralkyl and fluorine substituted acyl, and n is 0 or an integer of 1 to 1,000.

11. The surfactant according to claim 10, wherein $R^2$ is a saturated aliphatic hydrocarbon, a saturated alicyclic hydrocarbon, an aromatic hydrocarbon, an unsaturated aliphatic hydrocarbon or an unsaturated alicyclic hydrocarbon.

12. The surfactant according to claim 10, wherein $R^2$ is a residue that is obtained by removing the carboxylic groups from a dibasic acid selected from the group consisting of oxalic acid, malonic acid, succinic acid, glutaric acid, adipic acid, pimelic acid, suberic acid, azelaic acid, sebacic acid, undecanoic diacid, dodecanoic diacid, tridecanoic diacid, tetradecanoic diacid, cyclopentanedicarboxylic acid, hexahydrophthalic acid, methylhexahydrophthalic acid, phthalic acid, isophthalic acid, terephthalic acid, tolylenedicarboxylic acid, xylylendicarboxylic acid, maleic acid, fumaric acid, itaconic acid, citraconic acid, mesaconic acid, tetrahydrophthalic acid, methyltetrahydrophthalic acid, nadic acid, methylnadic acid, methylbutenyl tetrahydrophthalic acid and methylpentenyltetrahydrophthalic acid.

13. The surfactant according to claim 10, wherein M in Formula (1) is selected from the group consisting of a hydrogen atom, an alkaline metal atom, an alkaline earth metal atom, an ammonium of ammonia, an ammonium of an alkanolamine and an ammonium of an alkylamine.

14. The surfactant according to claim 10, wherein $R^1$ and $R^5$ each are the same or different and are at least one alkylene group having 2 to 4 carbon atoms or a phenylethylene group.

15. The surfactant according to claim 10, wherein $R^2$ has at least one polymerizable carbon-carbon double bond.

16. An emulsifier for use in emulsion polymerization, comprising a compound defined in claim 10.

17. A dispersant for use in suspension polymerization, comprising a compound defined in claim 10.

18. A modifier for use in modification of resin properties, comprising a compound defined in claim 10.

19. A surfactant comprising a compound represented by Formula (1)

$$[X-O-(R^1-O)_m-OC-R^2-COO]_y M \quad (1)$$

wherein M is a hydrogen atom, a metal atom or an ammonium group, y is equal to the valence of M, $R^1$ is at least one hydrocarbon group, $R^2$ is a $C_{1-24}$ divalent hydrocarbon linker that is obtained by removing both carboxylic groups from a dibasic acid consisting essentially of carbon, hydrogen and oxygen, m is 0 or an integer of 1 to 1,000, and X is represented by Formula (B)

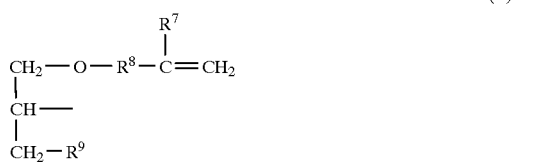

wherein $R^7$ is a hydrogen atom or a methyl group, $R^8$ is $CH_2$ or $C=O$, $R^9$ is selected from the group consisting of a hydrogen atom, alkyl, alkenyl, aralkyl, acyl, fluorine substituted alkyl, fluorine substituted alkenyl, fluorine substituted aralkyl and fluorine substituted acyl.

20. The surfactant according to claim 19, wherein $R^2$ is a saturated aliphatic hydrocarbon, a saturated alicyclic hydrocarbon, an aromatic hydrocarbon, an unsaturated aliphatic hydrocarbon or an unsaturated alicyclic hydrocarbon.

21. The surfactant according to claim 19, wherein $R^2$ is a residue that is obtained by removing the carboxylic groups from a dibasic acid selected from the group consisting of oxalic acid, malonic acid, succinic acid, glutaric acid, adipic acid, pimelic acid, suberic acid, azelaic acid, sebacic acid, undecanoic diacid, dodecanoic diacid, tridecanoic diacid, tetradecanoic diacid, cyclopentanedicarboxylic acid, hexahydrophthalic acid, methylhexahydrophthalic acid, phthalic acid, isophthalic acid, terephthalic acid, tolylenedicarboxylic acid, xylylendicarboxylic acid, maleic acid, fumaric acid, itaconic acid, citraconic acid, mesaconic acid, tetrahydrophthalic acid, methyltetrahydrophthalic acid, nadic acid, methylnadic acid, methylbutenyl tetrahydrophthalic acid and methylpentenyltetrahydrophthalic acid.

22. The surfactant according to claim 19, wherein M in Formula (1) is selected from the group consisting of a hydrogen atom, an alkaline metal atom, an alkaline earth metal atom, an ammonium of ammonia, an ammonium of an alkanolamine and an ammonium of an alkylamine.

23. The surfactant according to claim 19, wherein $R^1$ is at least one alkylene group having 2 to 4 carbon atoms or a phenylethylene group.

24. The surfactant according to claim 19, wherein $R^2$ has at least one polymerizable carbon-carbon double bond.

25. An emulsifier for use in emulsin polymerization, comprising a compound defined in claim 19.

26. A dispersant for use in suspension polymerization, comprising a compound defined in claim 19.

27. A modifier for use in modification of resin properties, comprising a compound defined in claim 19.

28. A surfactant comprising a compound represented by Formula (1)

$$[X-O-(R^1-O)_m-OC-R^2-COO]_y M \quad (1)$$

wherein M is a hydrogen atom, a metal atom or an ammonium group, y is equal to the valence of M, $R^1$ is at least one hydrocarbon group, $R^2$ is a $C_{1-24}$ divalent hydrocarbon linker that is obtained by removing both carboxylic groups from a dibasic acid consisting essentially of carbon, hydrogen and oxygen, m is 0 or an integer of 1 to 1,000, and X is represented by Formula (C)

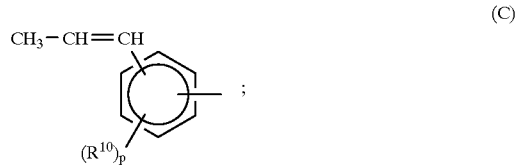

wherein $R^{10}$ is selected from the group consisting of alkyl, alkenyl, aralkyl, acyl, fluorine substituted alkyl, fluorine substituted alkenyl, fluorine substituted aralkyl and fluorine substituted acyl, and p is 0 or an integer of 1 to 4.

29. The surfactant according to claim 28, wherein $R^2$ is a saturated aliphatic hydrocarbon, a saturated alicyclic hydrocarbon, an aromatic hydrocarbon, an unsaturated aliphatic hydrocarbon or an unsaturated alicyclic hydrocarbon.

30. The surfactant according to claim 28, wherein $R^2$ is a residue that is obtained by removing the carboxylic groups from a dibasic acid selected from the group consisting of oxalic acid, malonic acid, succinic acid, glutaric acid, adipic acid, pimelic acid, suberic acid, azelaic acid, sebacic acid, undecanoic diacid, dodecanoic diacid, tridecanoic diacid, tetradecanoic diacid, cyclopentanedicarboxylic acid, hexahydrophthalic acid, methylhexahydrophthalic acid, phthalic acid, isophthalic acid, terephthalic acid, tolylenedicarboxylic acid, xylylendicarboxylic acid, maleic acid, fumaric acid, itaconic acid, citraconic acid, mesaconic acid, tetrahydrophthalic acid, methyltetrahydrophthalic acid, nadic acid, methylnadic acid, methylbutenyl tetrahydrophthalic acid and methylpentenyltetrahydrophthalic acid.

31. The surfactant according to claim 28, wherein M in Formula (1) is selected from the group consisting of a hydrogen atom, an alkaline metal atom, an alkaline earth metal atom, an ammonium of ammonia, an ammonium of an alkanolamine and an ammonium of an alkylamine.

32. The surfactant according to claim 28, wherein $R^1$ is at least one alkylene group having 2 to 4 carbon atoms or a phenylethylene group.

33. The surfactant according to claim 28, wherein $R^2$ has at least one polymerizable carbon-carbon double bond.

34. An emulsifier for use in emulsion polymerization, comprising a compound defined in claim 28.

35. A dispersant for use in suspension polymerization, comprising a compound defined in claim 28.

36. A modifier for use in modification of resin properties, comprising a compound defined in claim 28.

* * * * *